W. T. McMASTERS.
Coupler for Shafting.

No. 215,762. Patented May 27, 1879.

WITNESSES

INVENTOR
William T. McMasters
By
R. S. & A. P. Lacey
ATTORNEYS

UNITED STATES PATENT OFFICE.

WILLIAM T. McMASTERS, OF MARTIN'S FERRY, OHIO.

IMPROVEMENT IN COUPLERS FOR SHAFTING.

Specification forming part of Letters Patent No. 215,762, dated May 27, 1879; application filed March 6, 1879.

*To all whom it may concern:*

Be it known that I, WILLIAM T. McMASTERS, of Martin's Ferry, in the county of Belmont and State of Ohio, have invented certain new and useful Improvements in Couplers for Shafting; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention consists in a substantial shell, an inner block, and an oscillating clutch or dog, all constructed and arranged as hereinafter fully set forth.

Figure 1:
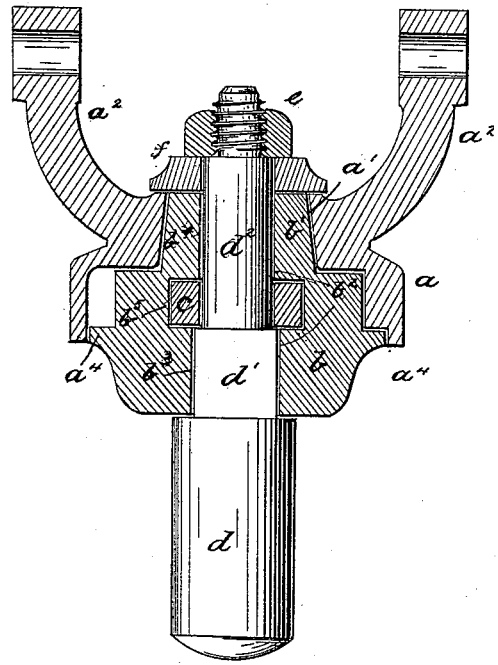
Figure 2:
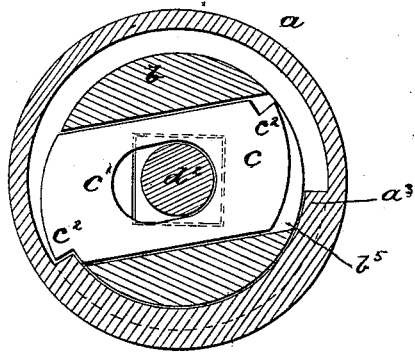
Figure 3:
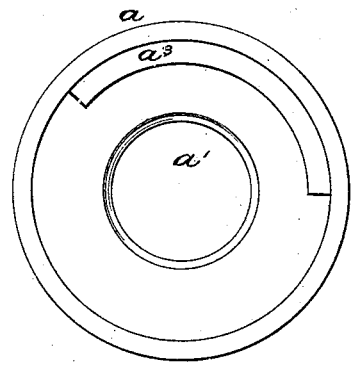

In the drawings, Figure 1 is a vertical section, and Fig. 2 a horizontal section, of a coupling constructed according to my invention; and Fig. 3 is an under-side view of the shell, showing the shoulder against which the hook on the dog catches.

$a$ is the shell, within which the block $b$ and dog $c$ are placed. It is provided with a central opening, $a^1$, which fits around the upper end of the block $b$, and it has the clevis-arms $a^2$ $a^2$, by which it is attached to the end of the shaft.

On the inner side of the shell there is formed the oblong shoulder $a^3$, against the ends of which the hooks on the dog engage in the revolution of the shafting.

The block $b$ fits inside the shell $a$, and has its upper end, $b^1$, extended through the opening $a^1$ in the shell, as shown, and has a central longitudinal opening, $b^2$, the lower end, $b^3$, of which is made rectangular, and the upper end, $b^4$, is made circular in shape, and adapted to fit over the end of the shaft $d$, which is correspondingly formed to receive it.

$b^5$ is a horizontal mortise cut through the block $b$, having its lower side flush with the upper end of the rectangular mortise $b^3$.

Within the mortise is placed the dog $c$, which oscillates from side to side of the said block. The block $b$ is made slightly less in diameter than the shell $a$, so that it fits snugly against the vertical side of the oblong shoulder $a^3$, and it has formed around its outer or lower end the rim $a^4$, which is of the same diameter as the inner diameter of said shell, and makes a close fit when the several parts are brought together, as shown in Fig. 1.

The shaft $d$ is made with the rectangular shank $d^1$, which fits within the rectangular mortise $b^3$ in the block $b$. The upper part, $d^2$, of the shaft is, by preference, made round and extends through the block, and has the thread on its outer end for the reception of the nut $e$, which turns down onto a washer, $f$, and holds the shell $a$, block $b$, and shaft $d$ together.

The dog $c$ has formed through it the elongated opening $c^1$, through which the end $d^2$ of the shaft $d$ passes, and in the revolutions of the coupling it will oscillate from side to side, as the movements of the machinery may require, and cause the hooks $c^2$ to engage the shoulder $a^3$. The ends of the dog are rounded, as shown, so that it will slide freely against the curved sides of the shell or shoulder $a^3$.

By the construction of the several parts as stated, I am enabled to furnish a much more substantial clutch-coupling than has heretofore been done; and by the arrangement of the parts as set forth, I have provided a device which is efficient and perfect in all its operations.

By separating the casing or block $b$ and shaft $d$ the dog $c$ may be reversed, when it is desired to have the motion of the operating machinery reversed.

The block $b$ might be formed as a head-piece to the shaft $d$, which could have an extension and screw to receive the nut $e$ and washer $f$. In this case it would not be necessary to form the slot $c^1$ in the dog $c$, the said slot being cut to give passage to the end $d^2$ of the shaft $d$. I prefer to make the device in the manner herein specifically described.

By constructing the parts $a$, $b$, and $c$ in separate pieces, as explained, the clutch can be manufactured and sold independently of the shafting to which it may be applied. The arms $a^2$ furnish the necessary means for connecting with the ordinary tumbler or shaft attachments.

The end of the shaft $d$ may be shaped, by any ordinary blacksmith, to fit snugly in the mortise $b^2$, and so that it can be secured and held in place by the washer $f$ and nut or pin $e$.

I am aware that sliding dogs working without springs are not new of themselves, and therefore do not claim it, broadly.

Having thus described my invention, what I claim, and desire to secure by Letters Patent, is—

1. In a coupler for shafting, the combination, with the shaft $d$, provided with the rectangular shank $d^1$, of the removable head or block $b$ and sliding dog $c$, having slot $c^1$, through which the end $d^2$ of the shaft $d$ passes, all constructed and operating substantially as and for the purposes set forth.

2. The combination, with the casing $a$, having the central opening, $a^1$, arms $a^2$, and inner shoulder, $a^3$, of the head-block $b$, formed or placed on the shaft $d$, having the extension $b^1$ and horizontal mortise $b^5$, and held in the casing $a$ by a suitable washer and nut or pin, and the oscillating dog $c$, substantially as and for the purposes set forth.

In testimony that I claim the foregoing as my own I affix my signature in presence of two witnesses.

WILLIAM T. McMASTERS.

Witnesses:
 JAMES KERR,
 SAMUEL I. DEAN.